United States Patent [19]

Fredrickson et al.

[11] Patent Number: 5,265,674
[45] Date of Patent: Nov. 30, 1993

[54] ENHANCEMENT OF IN SITU MICROBIAL REMEDIATION OF AQUIFERS

[75] Inventors: James K. Fredrickson; Fred J. Brockman, both of Kennewick; Gary P. Streile; John W. Cary, both or Richland, all of Wash.; John F. McBride, Carrboro, N.C.

[73] Assignee: Battelle Memorial Institute, Richland, Wash.

[21] Appl. No.: 893,458

[22] Filed: Feb. 20, 1992

[51] Int. Cl.⁵ .................. E21B 43/00; E21B 43/24; E02D 3/00; E02D 3/11
[52] U.S. Cl. ..................... 166/246; 166/50; 166/272; 166/303; 166/371
[58] Field of Search ............... 166/246, 371, 50, 272, 166/268, 305.1, 302, 303

[56] References Cited

U.S. PATENT DOCUMENTS

| | | | |
|---|---|---|---|
| 2,807,570 | 9/1957 | Updegraff | 166/246 |
| 3,185,216 | 5/1965 | Hitzman | 166/246 |
| 3,332,487 | 7/1967 | Jones | 166/246 |
| 3,628,607 | 12/1971 | Dietz | 166/371 |
| 3,846,290 | 11/1974 | Raymond | 166/246 X |
| 4,832,122 | 5/1989 | Corey et al. | 166/50 X |
| 4,997,313 | 3/1991 | Gibson et al. | 166/371 X |
| 5,018,576 | 5/1991 | Udell et al. | 166/272 |
| 5,044,435 | 9/1991 | Sperl et al. | 166/246 |

Primary Examiner—Stephen J. Novosad
Attorney, Agent, or Firm—Stephen R. May

[57] ABSTRACT

Methods are provided for remediating subsurface areas contaminated by toxic organic compounds. An innocuous oil, such as vegetable oil, mineral oil, or other immiscible organic liquid, is introduced into the contaminated area and permitted to move therethrough. The oil concentrates or strips the organic contaminants, such that the concentration of the contaminants is reduced and such contaminants are available to be either pumped out of the subsurface area or metabolized by microorganisms. Microorganisms may be introduced into the contaminated area to effect bioremediation of the contamination. The methods may be adapted to deliver microorganisms, enzymes, nutrients and electron donors to subsurface zones contaminated by nitrate in order to stimulate or enhance denitrification.

19 Claims, 4 Drawing Sheets

ENHANCEMENT OF IN SITU MICROBIAL REMEDIATION OF AQUIFERS

This invention was made with Government support under Contract DE-AC06-76RLO 1830 awarded by the U.S. Department of Energy. The Government has certain rights in the invention.

BACKGROUND OF THE INVENTION

Thousands of hazardous waste sites have been identified, many of which exhibit evidence of subsurface contamination of either or both of the vadose zone or the water table (aquifers). The bulk of the hazardous waste sites contain some level of toxic organic compound contamination, and many of the remediation techniques are directed toward this type of contamination. While not generally considered "toxic", nitrate contamination has also been identified as a significant groundwater contaminant in many aquifers, and remediation techniques are proposed to remediate nitrate contamination as well.

Organic chemicals enter subsurface regions either as aqueous solutes or as liquids that are immiscible with water (and have limited water solubility). Complicating the removal of such compounds is the fact that when organics enter as liquids, isolated bubbles of liquid form when the organic redistributes in the subsurface (unless otherwise designated, "subsurface" as used herein may apply to either or both of the vadose zone or an aquifer) and can act as a source of continuous resupply of the contaminant to the groundwater.

Methods of remediation that result in minimal environmental impact are obviously preferred. The use of microorganisms (either introduced or native) to degrade organic contaminants into CO2, harmless inorganics and biomass is currently viewed as one of the most promising techniques. However, a number of factors limit the effectiveness of this technique, namely: lack of adequate nutrients, lack of electron donors, lack of sufficient concentration of microorganisms to transform the target compound, lack of growth and energy sources, low bioavailability of the target compounds, and inability to deliver the microorganisms to the location of the contaminants. In many cases, the last of these factors can be the most difficult to overcome.

Organic compounds typically found as contaminants of groundwater are present as aqueous solutes or as immiscible liquids (in a separate phase). Because organic liquids commonly have some limited solubility in water, groundwater (aquifers) contaminated with organic liquids usually will contain aqueous organic solutes as well. Such solutes are known to sorb to the solid particles that constitute the matrix of the vadose zone or aquifer in a manner that retards their movement along with the flowing pore water. Therefore, the sorption process renders pump and treat remediation methods inefficient because extremely large volumes of water must be pumped in order to move the sorbing compounds to the extraction well.

Because of the relatively large mass of organic contaminant present in the liquid phase compared to its aqueous solubility, organic liquid phases act as extremely long-lived sources of aqueous contamination. Even if the organic liquid phase is found and removed, pockets, bubbles or ganglia of residual organic liquid remain trapped in the pore spaces and act as contaminant reservoirs for dissolution for extended periods of time.

SUMMARY OF THE INVENTION

To enhance or initiate the in situ microbial degradation of toxic organic contaminants and maintain activity for extended periods in the subsurface, a non-toxic liquid organic material, such as an innocuous vegetable or mineral oil, is introduced into an area contaminated with such toxic organic compounds. The oil can be either injected into the appropriate location at or below the locus of the contamination, or it can be pooled on the surface and permitted to percolate down to the contamination. The oil will form noncontiguous pockets of oil that have larger surface areas of contact with the pore water phase. The oil can be injected in its natural state or emulsified to increase the surface area of the oil/water interface for microorganisms to colonize. Organics present as solutes in the groundwater will partition into the oil as the contaminant plume passes the dispersed oil curtain, depending on the relative affinity of the contaminant for the oil.

If the particular contaminants cannot be adequately biodegraded by the native in situ microflora, microorganisms (as used herein, "microorganisms" refers primarily to bacteria, but shall also be read to include fungi, enzymes and other organisms capable of carrying out the methods of this invention) capable of degrading the target contaminant can be added to the oil before it is introduced. Materials to enhance the viability and metabolism of the microorganisms may be added as well, such as nutrients, electron donors, carbon sources, and electron acceptors. Additionally, the oil may be emulsified to increase its effectiveness.

DETAILED DESCRIPTION OF THE INVENTION

Figure 1:
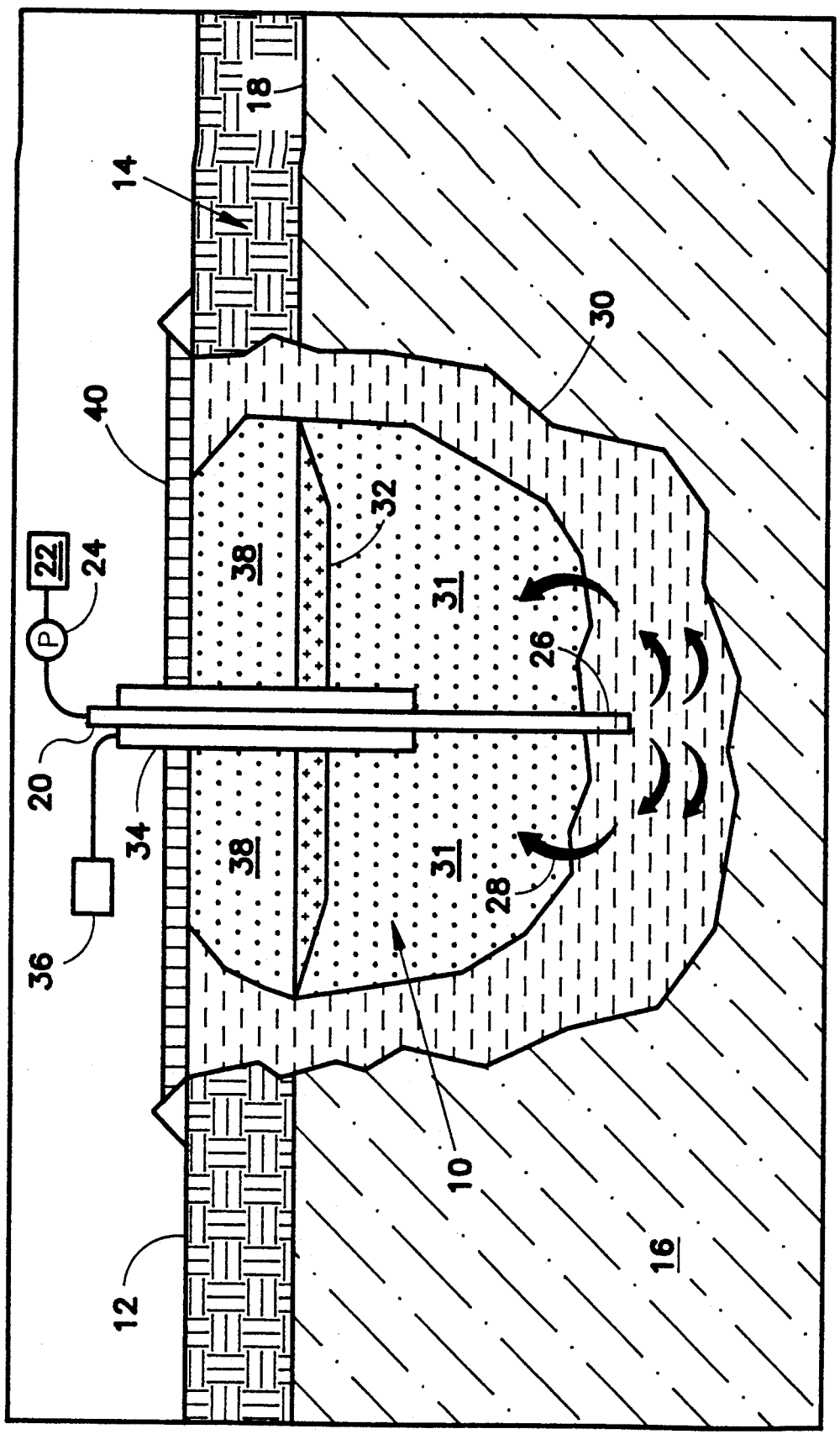
FIG. 1 is a schematic representation of a method to remediate a toxic organic contaminant plume distributed into both the vadose zone and an aquifer.

FIG. 1 is a schematic representation of a cross-sectional view of a subsurface area contaminated with a toxic organic compound. As used in most of the descriptive material relating to the Figures, the organic compound is a non-aqueous phase liquid (NAPL). The toxic organic contaminants can enter the subsurface environment either as aqueous solutes or as NAPLs that are immiscible with water and have limited water solubility, such as tetrachloromethane, trichloroethylene or fuels such as gasoline. When a NAPL spill into the vadose zone is large, the dispersed region of contamination may not be confined to the vadose zone. As illustrated in FIG. 1, the contaminated area 10 extends beneath the ground surface 12 through the vadose zone 14 and into an aquifer 16. If the NAPL is less dense than water, it will "pool up" on the upper boundary 18 of the aquifer, and if it is more dense than water, it will disperse throughout the vadose zone and the aquifer (as illustrated in FIG. 1).

As illustrated in FIG. 1, an injection well 20 is connected to a source of innocuous oil 22, which is pumped through pump 24 through the well (or bore) to a position 26 below the lowermost portion of the contaminant plume 10 in the aquifer. In this embodiment, an oil is chosen that is less dense than water, so that the oil rises through the water and contaminant plume 10 (illustrated by arrows 28). Injection of oil occurs under sufficient pressure to form a spreading plume of oil 30 that completely surrounds the contaminant plume 10. The rising oil, being an organic liquid, will flow preferentially through the same pore channels as contain the contaminant NAPL. As the rising oil encounters the bubbles and ganglia of the denser contaminant 31, the two liquids mix. The mixture becomes less dense than water and eventually floats to the upper boundary 18 of the aquifer, where it pools 32. The pool 32 of mixed organic liquid is then pumped to the surface through the perforated outer well casing 34 and disposed of at 36. Oil injection continues until all of the organic contaminant has been moved to the well, and then pumping of the pool 32 continues until all that remains in the aquifer are residual pockets of nontoxic innocuous oil, which will eventually biodegrade. It should be understood that the term "innocuous oil" as used herein is exemplified by vegetable oil or mineral oil, but is not so limited. Any immiscible organic liquid which fulfills the other requirements set forth herein, should be considered within the definition of "innocuous oil".

Residual contamination 38 only in the vadose zone can be remediated in essentially the opposite method as that described above. The oil can be ponded, at 40, on the surface 12 of the ground above the contaminated area 38. The oil percolates, or infiltrates, downwardly through the area 38 to the upper boundary 18 of the aquifer 16, where it pools 32. As the oil infiltrates down, it mixes with and leaches residual NAPL bubbles and ganglia. Infiltration is stopped when all toxic organic contamination has been removed from the vadose zone and pumped from the liquid pool. This method of remediation can likewise be used with an organic contaminant that is less dense than water (and has therefore pooled on the upper boundary of the aquifer). In such case, a vegetable oil would be preferred over mineral oil because its higher biodegradation rate will cause it to be removed from the environment faster.

Figure 2:
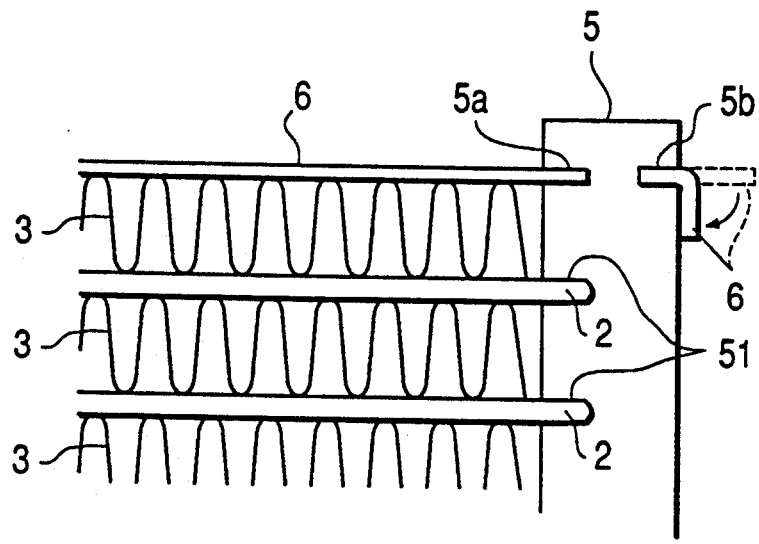
FIG. 2 is a schematic representation of a first method to remediate a toxic organic contaminant plume distributed in and moving through an aquifer.

A method has been devised to remove a mobile organic contamination that is less dense than water from an aquifer—in effect, a laterally flowing groundwater contaminant plume. As illustrated in FIG. 2, the contaminant plume 50 floats adjacent the upper boundary 18 of the aquifer 16. A curved bore hole 52 terminates in a horizontal portion 54 beneath the location the plume 50 will pass. Both ends 56, 58 of the horizontal portion 54 of the bore are heated, and the withdrawal well 60 is cooled. An exemplary heat pump 62 may be provided to effect both the heating and cooling. Oil from a storage vessel 22 is pumped through pump 24 through the bore 52 and out the horizontal portion 54 into the aquifer 16 before the contaminant plume 50 reaches this location. Therefore, a region 64 containing dispersed nontoxic oil at residual saturation is formed ahead of the plume and with a cross-sectional area greater than that of the plume. When the contaminant plume reaches the region 64, the oil has risen through the aquifer to the upper boundary 18 of the aquifer, and the organic contaminants are partitioned into the oil, since the organic contaminants, being solutes, have greater affinity for organic liquids than water. As fresh oil is injected it forces the mixed organic liquid to rise, where it pools on the aquifer, and is removed through withdrawal well 60. In this embodiment, mineral oil is preferred because its slower biodegradation rate means that bubbles will be present as organic solute scavengers for a longer time.

The scavenging of organic solutes from the contaminant plume is enhanced by establishing water convection cells (illustrated by arrows 66 in FIG. 2). Heating of the injection bore and cooling the withdrawal well creates the convection cells, and increases the length of contact between the contaminated groundwater and the scavaging oil bubbles.

As effective as the methods described above may be, in some cases their effectiveness may be increased if they are coupled with bioremediation. This process may take either of two courses: materials may be added to the oil to enhance the growth and metabolism of existing native microorganisms, or microorganisms may be added to the oil prior to injection. For example, FIG. 3 illustrates the in situ microbial degradation of organic solutes in an aquifer, which is initiated and maintained by injecting a mixture 70 of an innocuous oil that is less dense than water and microorganism growth-enhancing materials through a bore 72 into a contaminated aquifer 16 ahead of the contamination plume 74. After oil injection is stopped, the oil plume will continue to redistribute, forming noncontiguous pockets of oil that have a large total surface area of contact with the pore-water phase. The oil can be emulsified to increase the surface area of the oil/water interface, which is the most likely site for indigenous bacteria to colonize. The degree to which organics present as solutes in the contaminant plume will partition into the innocuous oil as the contaminant plume passes through the region of dispersed oil bubbles depends on the relative affinity of the contaminant for the oil. This scavenging not only lowers the concentration of contaminant in the aqueous phase but also provides a means for concentrating the contaminants where they can be degraded by the actively metabolizing bacteria.

The materials injected with the oil of FIG. 3 are those which enhance the growth and metabolism of native in situ microorganisms. For numerous reasons, such microorganisms may not be capable of metabolizing the quantity of toxic organic contaminants without assistance. For example, nutrients which most often limit metabolism (nitrogen and phosphorous), and electron donors (carbon source for contaminants that can be degraded only through cometabolism) can be added as oleophilic fertilizer that remain with the oil phase as it moves through the soil matrix. The fertilizer is directly available to the microorganisms for an extended period of time. Electron acceptors (such as O2, NO3—, SO4) can also be incorporated.

Alternatively, native microorganisms can be added to the oil upon injection if inadequate quantities exist in situ, and non-native microorganisms can be added if appropriate native microorganisms to degrade the particular organic contaminant do not exist in situ. In either case, delivery of the microorganisms to the site of the contamination has proven to be difficult in prior art processes—use of innocuous oil as a transport medium solves this problem. The affinity of the microorganisms for the oil can be increased if the microorganisms are preconditioned by being grown in the oil.

The method of injecting innocuous oil and microorganisms may also be effective for remediating aquifers contaminated by organic liquids, even those at residual saturation. As the oil moves through the aquifer during redistribution, the oil mixes with the organic contaminant, rendering the organic contaminant physically accessible to the microorganism. Even if the organic contaminant is present at residual saturation, mixing of the nontoxic oil with isolated bubbles of the contaminant will occur because the oil will preferentially move through the same channels as the contaminant.

Figure 4:
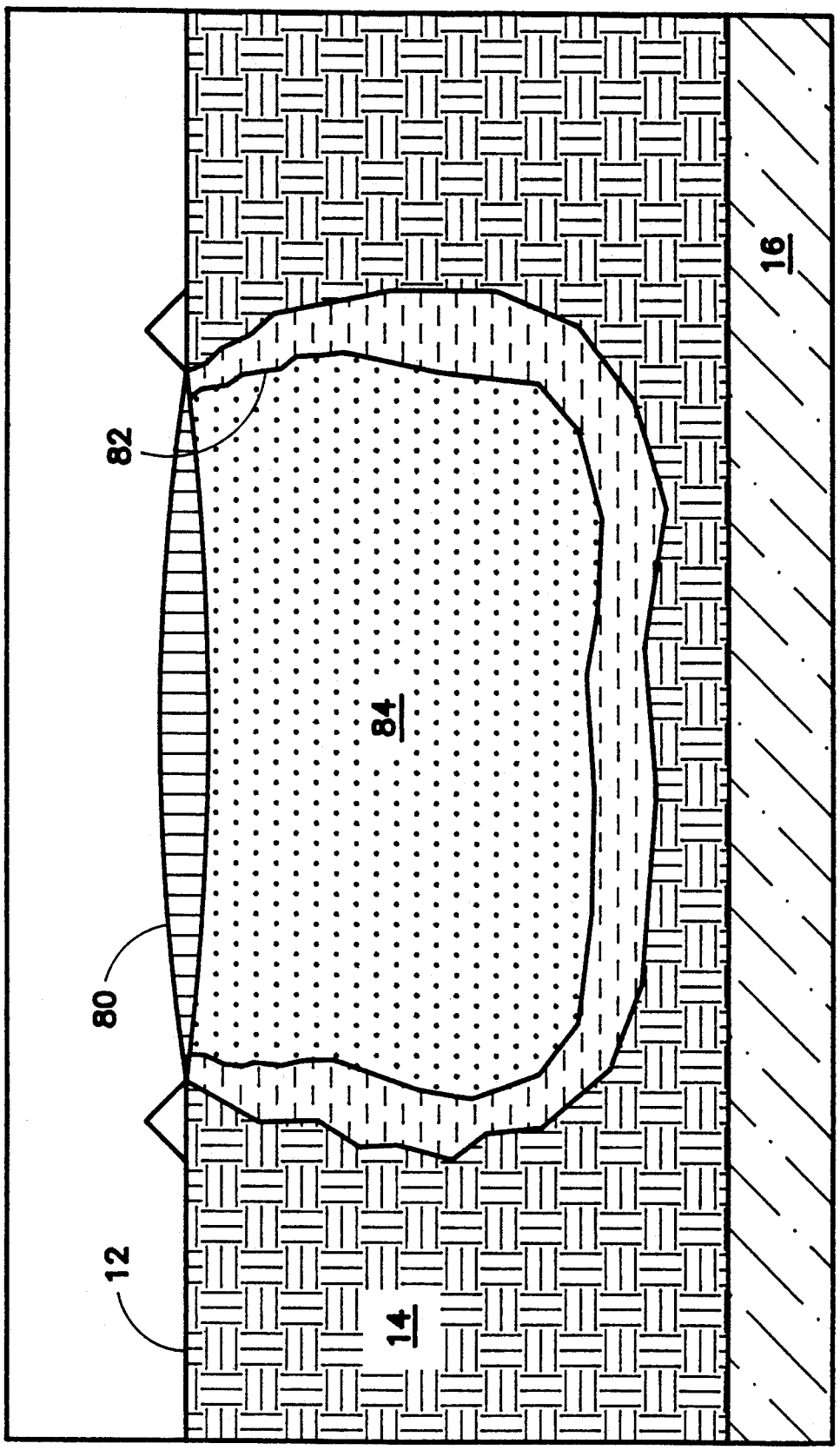
FIG. 4 is a schematic representation of a method to remediate a toxic organic contaminant plume distributed into only the vadose zone.
Figure 2:
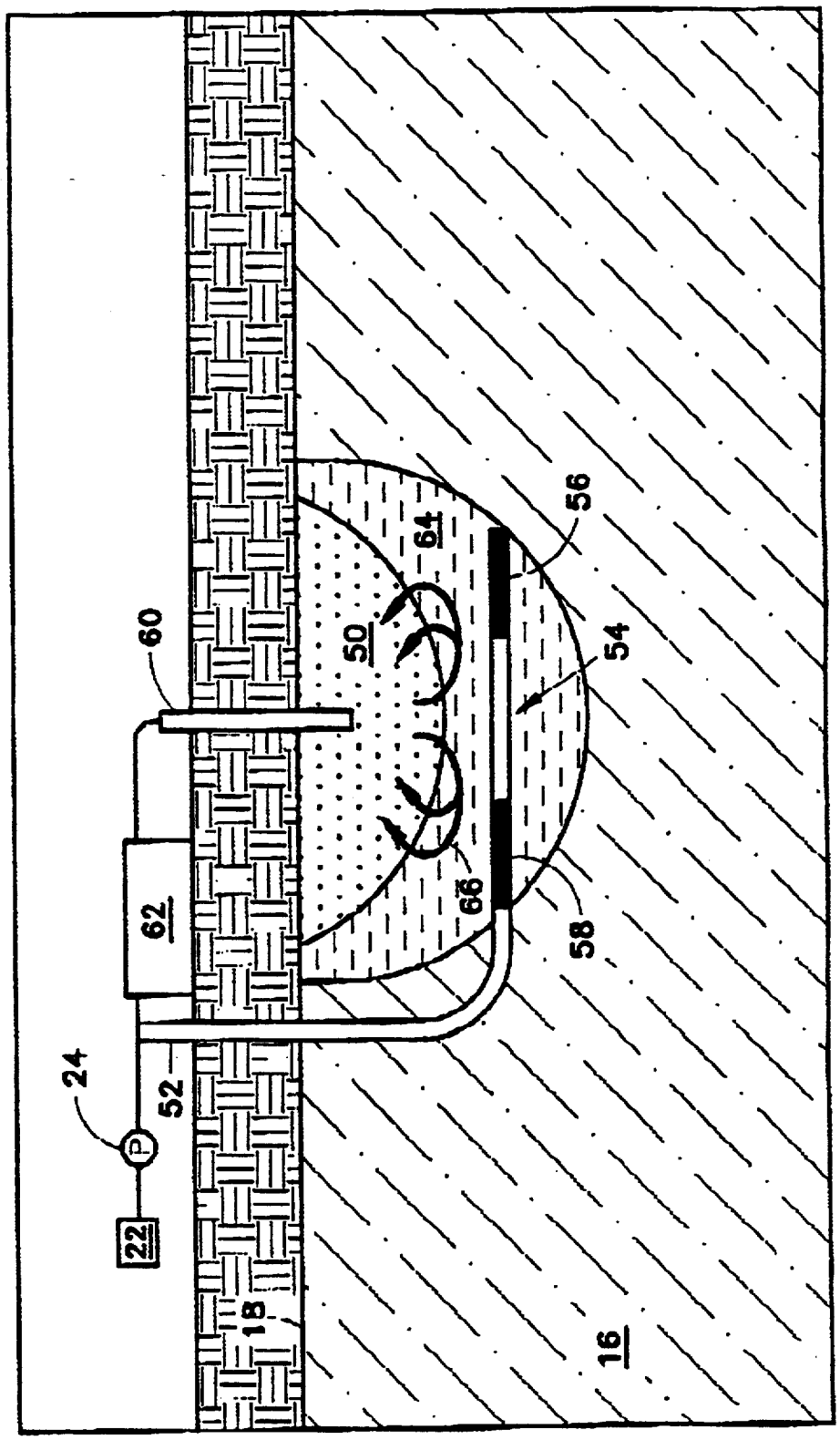

Contaminants in the vadose zone are particularly difficult to degrade in situ because it is so difficult to deliver microorganisms and nutrients to the contaminated soil material. As illustrated in FIG. 4, one method to accomplish this is to pond the oil/bacteria mixture 80 on the soil surface 12, and permit a plume 82 of the mixture to infiltrate or percolate through the vadose zone 14 such that it essentially surrounds the contaminated region 84. The oil phase will disperse through the vadose zone and ultimately break into immobile non-contiguous bubbles or ganglia, in much the same manner as in the saturated zone. The pockets of oil mixture will be in long-term contact with the contaminated pore water and pore air in the vadose zone. As the oil moves through the profile, it will flow through approximately the same preferential flow channels as the toxic organic compounds. If organic liquids are the source of vadose zone contamination, the infiltrating oil mixture will deliver active microorganisms and nutrients to the residual pockets of organic liquid contaminant, mix with these liquid pockets, and stimulate in situ biodegradation.

The methods of the present invention can be adapted to remediate nitrate contamination of aquifers. A carbon and energy source is added to the subsurface environment, and the microorganisms use the nitrate in the contaminant plume as an electron acceptor following depletion of oxygen during degradation. The carbon and energy source can be supplied as the oil or another organic substrate blended into the oil. If no denitrifying microorganisms are indigenous, appropriate microorganisms can be mixed with the oil prior to injection.

While a number of embodiments of the invention have been provided, the invention disclosed herein should not be deemed limited by the particular embodiments set forth. Those skilled in this art will appreciate that numerous variations of the preferred embodiments set forth herein may be made without departing from the scope of the invention. Therefore, the scope of our invention should be determined solely by the claims appended hereto.

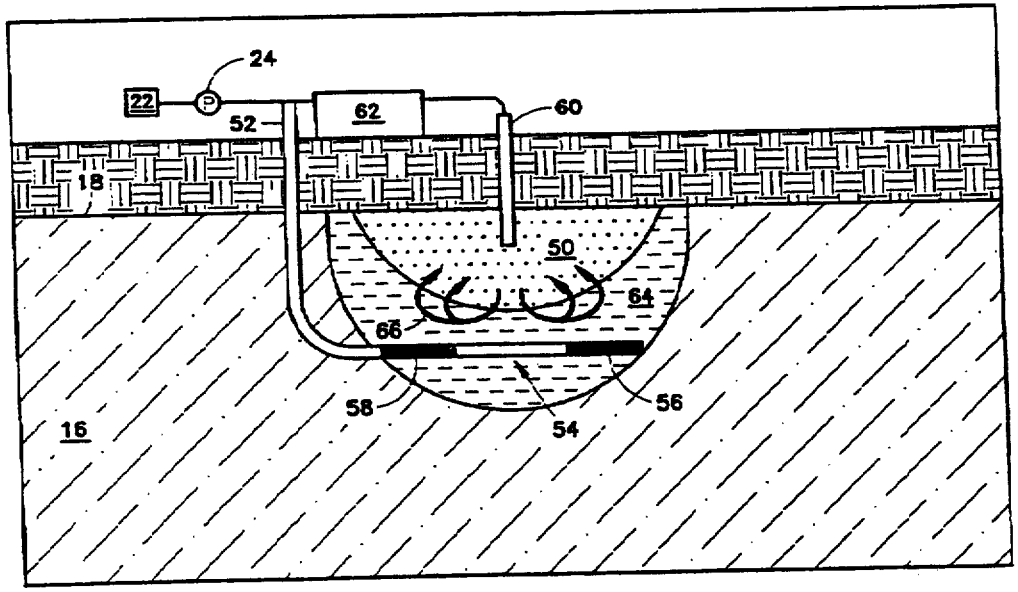

We claim:

1. A method of remediating subsurface vadose zones and aquifers contaminated with contaminates selected from the group consisting or organic compounds and nitrates, comprising the step of introducing an innocuous oil into that portion of the vadose zones or aquifers contaminated with said contaminants.

2. A method for the remediation of an aquifer contaminated with organic compounds, comprising:
   a. injecting an innocuous oil into the aquifer through a horizontal heated bore in advance of the contaminated portion of said aquifer;
   b. permitting the oil to rise through the contaminated portion of said aquifer;
   c. pumping the oil from an upper portion of said aquifer through a withdrawal bore.

3. The method of claim 2, further comprising cooling the area immediately adjacent the withdrawal bore to a temperature less than that of the area surrounding the horizontal heated bore.

4. The method of claim 2, further comprising injecting microorganisms with said oil, said microorganisms being capable of biodegrading organic compounds.

5. A method of remediation of a contaminated subsurface zone contaminated with nitrates, comprising the steps of
   introducing an innocuous oil into the contaminated subsurface zone,
   contacting the nitrates with the innocuous oil, to form a nitrate/oil mixture, and
   extracting the nitrate/oil mixture from the subsurface zone.

6. A method of remediating subsurface vadose zone and aquifers contaminated with compounds selected from the group consisting of organic compounds and nitrates, comprising the step of introducing an innocuous oil into that portion of the vadose zones or aquifers contaminated with organic compounds, through a bore under sufficient pressure to create a spreading plume of oil, said plume of oil injected below the level of said organic compounds in an aquifer, such that the plume of oil will rise through the organic compounds in the aquifer to form a mixture of the oil and organic solutes.

7. The method as recited in claim 6, further comprising utilizing an innocuous oil selected from the group consisting of light mineral oil and vegetable oil.

8. The method as recited in claim 6, further comprising injecting the oil into a contaminated aquifer through a bore under sufficient pressure to create a spreading plume of oil injected below the level of said organic compounds in an aquifer, such that the plume of oil will rise through the organic compounds in the aquifer to form a mixture of the oil and organic solutes.

9. The method as recited in claim 8, further comprising pumping the mixture of oil and organic to the surface through an outer well casing of said bore.

10. The method as recited in claim 8, further comprising arranging a plurality of bores in a pattern sufficient to create overlapping plumes of oil, such that a large area contaminated with organic compounds may be remediated.

11. The method as recited in claim 6, further comprising ponding a quantity of oil on the surface above an area of organic compound contamination, and permitting said oil to percolate downwardly through said area of contamination until an oil and organic compound mixture pools at an upper boundary of said aquifer.

12. The method as recited in claim 11, further comprising pumping said oil and organic compound mixture to the surface.

13. The method as recited in claim 6, further comprising pumping oil into an aquifer in advance of a moving plume of organic compounds, said oil being pumped through a first heated, horizontal bore, such that a mixture of oil and organic compounds is formed that pools on an upper boundary of said aquifer.

14. The method as recited in claim 13, further comprising pumping said mixture of oil and organic compounds to the surface through a second bore.

15. The method as recited in claim 14, further comprising cooling the second bore to set up convection cells in the aquifer between the first and second bores.

16. The method as recited in claim 6, further comprising adding effective amounts of nutrients, electron donors, carbon source and electron acceptors to said oil so as to enhance the growth and metabolism of microorganisms in a contaminated areas into which the oil is introduced.

17. The method as recited in claim 16, further comprising emulsifying the oil.

18. The method as recited in claim 6, further comprising adding microorganisms to the oil.

19. A method of remediating organic compounds in subsurface contaminated vadose zones and aquifers, comprising the step of introducing a mixture of an innocuous oil and microorganisms into the contaminated vadose zone and aquifer through a heated bore.

* * * * *

UNITED STATES PATENT AND TRADEMARK OFFICE
CERTIFICATE OF CORRECTION

PATENT NO. : 5,265,674
DATED : November 30, 1993
INVENTOR(S) : James K. Fredrickson et al It is certified that error appears in the above-indentified patent and that said Letters Patent is hereby corrected as shown below:

On the title page, item [21] replace "893,458" with --839,458--.

The title page showing the illustrative Figure should be deleted to be replaced with the attached title page.

Figure 3A:
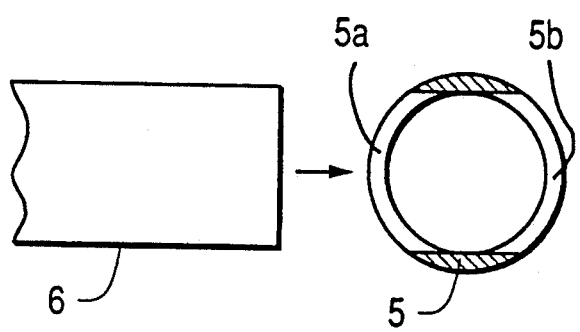
FIG. 3 is a schematic representation of a second method to remediate a toxic organic contaminant plume distributed in and moving through an aquifer.
Figure 3B:
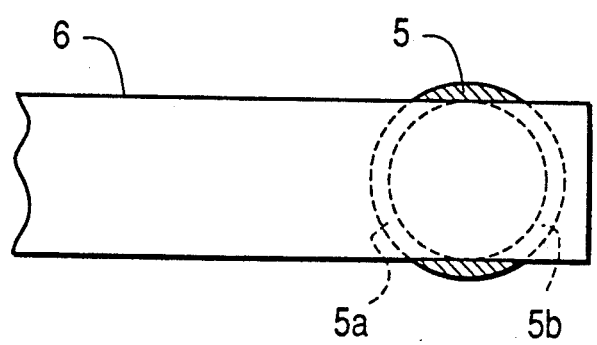
Figure 3:
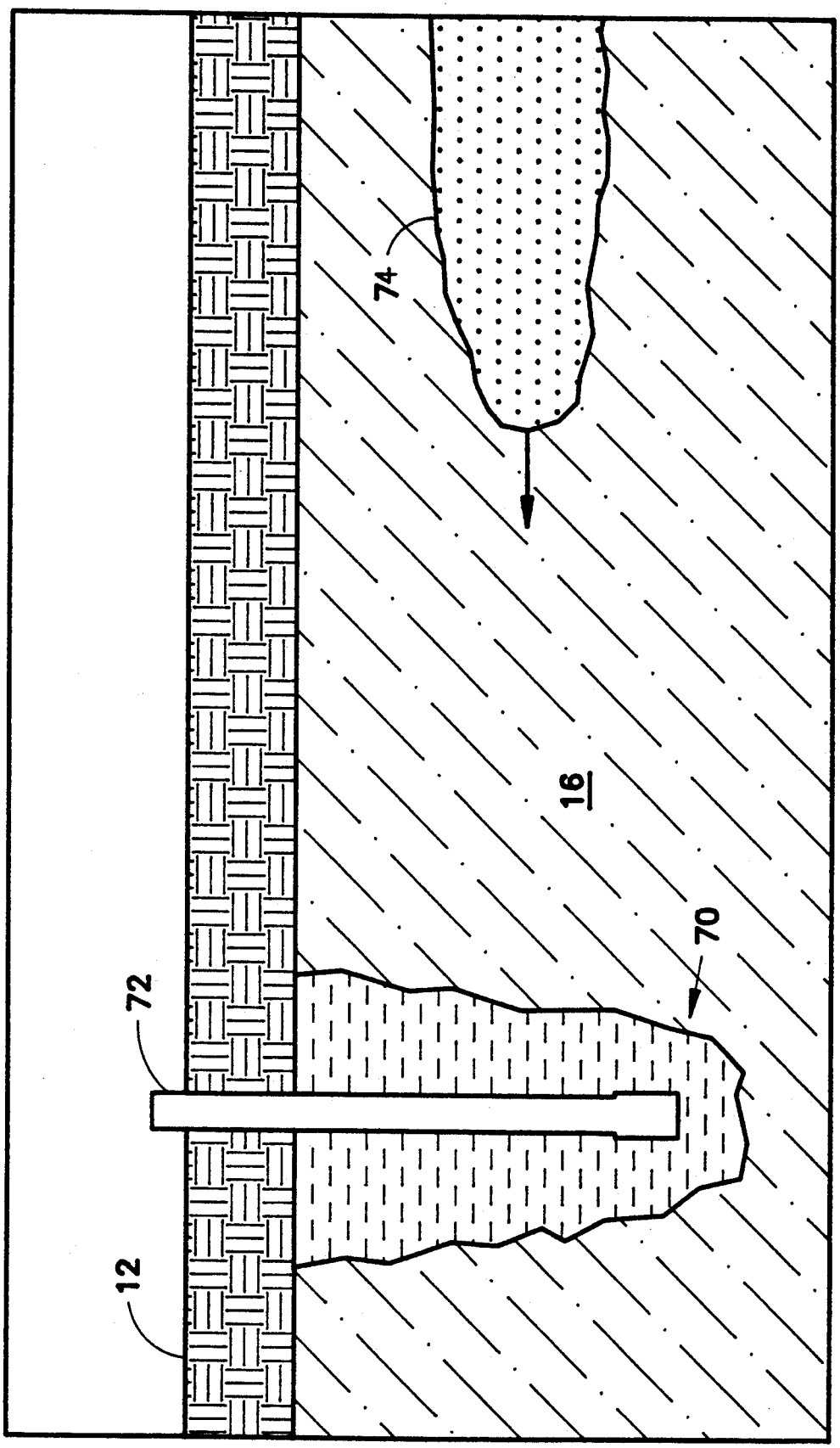

In the drawings, sheet 2 of 4 consisting of Figs. 2, 3(a) and 3(b), should be deleted to be replaced with the sheet of drawing consisting of Fig. 2, as shown on the attached page.

Signed and Sealed this

Thirteenth Day of September, 1994

*Attest:*

BRUCE LEHMAN

*Attesting Officer*   *Commissioner of Patents and Trademarks*

United States Patent [19]
Fredrickson et al.

[11] Patent Number: 5,265,674
[45] Date of Patent: Nov. 30, 1993

[54] ENHANCEMENT OF IN SITU MICROBIAL REMEDIATION OF AQUIFERS

[75] Inventors: James K. Fredrickson; Fred J. Brockman, both of Kennewick; Gary P. Streile; John W. Cary, both of Richland, all of Wash.; John F. McBride, Carrboro, N.C.

[73] Assignee: Battelle Memorial Institute, Richland, Wash.

[21] Appl. No.: 893,458

[22] Filed: Feb. 20, 1992

[51] Int. Cl.$^5$ ............ E21B 43/00; E21B 43/24; E02D 3/00; E02D 3/11
[52] U.S. Cl. .................... 166/246; 166/50; 166/272; 166/303; 166/371
[58] Field of Search ......... 166/246, 371, 50, 272, 166/268, 305.1, 302, 303

[56] References Cited

U.S. PATENT DOCUMENTS

| | | | |
|---|---|---|---|
| 2,807,570 | 9/1957 | Updegraff | 166/246 |
| 3,185,216 | 5/1965 | Hitzman | 166/246 |
| 3,332,487 | 7/1967 | Jones | 166/246 |
| 3,628,607 | 12/1971 | Dietz | 166/371 |
| 3,846,290 | 11/1974 | Raymond | 166/246 X |
| 4,832,122 | 5/1989 | Corey et al. | 166/50 X |
| 4,997,313 | 3/1991 | Gibson et al. | 166/371 X |
| 5,018,576 | 5/1991 | Udell et al. | 166/272 |
| 5,044,435 | 9/1991 | Sperl et al. | 166/246 |

*Primary Examiner*—Stephen J. Novosad
*Attorney, Agent, or Firm*—Stephen R. May

[57] ABSTRACT

Methods are provided for remediating subsurface areas contaminated by toxic organic compounds. An innocuous oil, such as vegetable oil, mineral oil, or other immiscible organic liquid, is introduced into the contaminated area and permitted to move therethrough. The oil concentrates or strips the organic contaminants, such that the concentration of the contaminants is reduced and such contaminants are available to be either pumped out of the subsurface area or metabolized by microorganisms. Microorganisms may be introduced into the contaminated area to effect bioremediation of the contamination. The methods may be adapted to deliver microorganisms, enzymes, nutrients and electron donors to subsurface zones contaminated by nitrate in order to stimulate or enhance denitrification.

19 Claims, 4 Drawing Sheets